(12) United States Patent
Yosida et al.

(10) Patent No.: US 9,052,334 B2
(45) Date of Patent: Jun. 9, 2015

(54) ACCELERATION SENSOR

(75) Inventors: Hitoshi Yosida, Osaka (JP); Yuji Suzuki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 108 days.

(21) Appl. No.: 13/511,466

(22) PCT Filed: Nov. 17, 2010

(86) PCT No.: PCT/IB2010/002947
§ 371 (c)(1),
(2), (4) Date: Jul. 31, 2012

(87) PCT Pub. No.: WO2011/064641
PCT Pub. Date: Jun. 3, 2011

(65) Prior Publication Data
US 2012/0280334 A1 Nov. 8, 2012

(30) Foreign Application Priority Data

Nov. 24, 2009 (JP) ................................. 2009-266584

(51) Int. Cl.
| H01L 29/84 | (2006.01) |
| H01L 21/00 | (2006.01) |
| G01P 15/125 | (2006.01) |
| G01P 15/08 | (2006.01) |
| G01P 15/18 | (2013.01) |

(52) U.S. Cl.
CPC ........... *G01P 15/125* (2013.01); *G01P 15/0802* (2013.01); *G01P 15/18* (2013.01); *G01P 2015/0831* (2013.01)

(58) Field of Classification Search
CPC ....... H01L 29/84; H01L 21/66; H01L 21/302; H01L 27/14; H01L 29/82

USPC .................................................. 257/254, 415
See application file for complete search history.

(56) References Cited

U.S. PATENT DOCUMENTS 5,962,789 A * 10/1999 Matsunaga et al. ........ 73/514.38
7,426,863 B2 9/2008 Kuisma
(Continued)

FOREIGN PATENT DOCUMENTS

| CN | 101198874 A | 6/2008 |
| CN | 101772705 A | 7/2010 |

(Continued)

OTHER PUBLICATIONS

International Search Report for PCT/IB2010/002947.
(Continued)

*Primary Examiner* — Chuong A Luu
*Assistant Examiner* — Moin Rahman
(74) *Attorney, Agent, or Firm* — Bacon & Thomas, PLLC

(57) ABSTRACT

In an acceleration sensor, a sensor unit includes a weight portion having a recess section with one open surface and a solid section one-piece formed with the recess section, beam portions for rotatably supporting the weight portion such that the recess section and the solid section are arranged along a rotation direction, a movable electrode, fixed electrodes, detection electrodes electrically connected to the fixed electrodes to detect a capacitance between the movable electrode and the fixed electrodes. A fixed plate is arranged in a spaced-apart relationship with a surface of the weight portion on which the movable electrode is provided, and embedment electrodes are embedded in the fixed plate to extend along a thickness direction of the fixed plate, the embedment electrodes having one end portions facing the movable electrode to serve as the fixed electrodes and the other end portions configured to serve as the detection electrodes.

22 Claims, 5 Drawing Sheets

(56) References Cited

U.S. PATENT DOCUMENTS

| | | | |
|---|---|---|---|
| 7,578,190 B2 | 8/2009 | Lin et al. | |
| 2002/0083777 A1* | 7/2002 | Mochida | 73/818 |
| 2004/0226374 A1* | 11/2004 | Kuisma et al. | 73/514.32 |
| 2004/0263186 A1 | 12/2004 | Yarita et al. | |
| 2006/0097331 A1* | 5/2006 | Hattori et al. | 257/414 |
| 2007/0000323 A1* | 1/2007 | Kuisma | 73/514.32 |
| 2007/0234804 A1 | 10/2007 | Tamura et al. | |
| 2009/0183569 A1* | 7/2009 | Aizawa et al. | 73/504.15 |
| 2010/0037691 A1* | 2/2010 | Jeong et al. | 73/504.12 |

FOREIGN PATENT DOCUMENTS

| | | |
|---|---|---|
| JP | 7263711 | 10/1995 |
| JP | 2000-187041 A | 7/2000 |
| JP | 2006133245 | 5/2006 |
| JP | 2006519387 | 8/2006 |
| JP | 2007298405 | 11/2007 |
| JP | 2008544243 | 12/2008 |
| JP | 2009016717 | 1/2009 |
| JP | 2009270944 | 11/2009 |
| JP | 2010127648 | 6/2010 |
| WO | 2006009194 A1 | 1/2006 |
| WO | 2006/134232 A1 | 12/2006 |
| WO | 2009020716 A1 | 2/2009 |

OTHER PUBLICATIONS

Office Action dated Apr. 27, 2013 issued in corresponding Chinese application No. 201080052782.3 (w/English Summary thereof).
Search Report dated May 27, 2013 issued in corresponding European application No. 10832713.1.
European Office Action dated Feb. 20, 2014, for EP 10 832 713.1.

* cited by examiner

ACCELERATION SENSOR

FIELD OF THE INVENTION

The present invention relates to a capacitive acceleration sensor.

BACKGROUND OF THE INVENTION

There is conventionally known an acceleration sensor that includes a rectangular parallelepiped weight portion having a movable electrode; a pair of beam portions for rotatably supporting the weight portion substantially at a center in the longitudinal direction of the weight portion; and a pair of fixed electrodes arranged in a spaced-apart opposing relationship with respect to one side and the other side of the surface of the weight portion demarcated by a straight line interconnecting the beam portions (see, e.g., Japanese Patent Application Publication No. 2008-544243).

One prior art example of the acceleration sensor will now be described with reference to FIGS. 4 and 5. In the following description, upper and lower sides in FIG. 4 will be defined as an up-down direction, the direction parallel to the width direction of a sensor chip 1 as an x-direction, the direction parallel to the longitudinal direction of the sensor chip 1 as a y-direction and the direction orthogonal to the x-direction and the y-direction as a z-direction. As shown in FIGS. 4 and 5, the acceleration sensor of the prior art example includes the sensor chip 1 having a rectangular plate-like outward appearance; an upper fixed plate 2a fixed to the upper surface of the sensor chip 1; and a lower fixed plate 2b fixed to the lower surface of the sensor chip 1.

The sensor chip 1 includes a frame portion 3 having two rims 3a and 3b formed into a rectangular shape when seen in the up-down direction and arranged side by side along the longitudinal direction; rectangular parallelepiped weight portions 4 and 5 arranged adjacent to each other inside the rims 3a and 3b in a spaced-apart relationship with respect to the inner circumferential surfaces of the rims 3a and 3b; two pairs of beam portions 6a and 6b, and 7a and 7b for respectively interconnecting the inner circumferential surfaces of the rims 3a and 3b and the side surfaces of the weight portions 4 and 5 to rotatably support the weight portions 4 and 5 with respect to the frame portion 3; and movable electrodes 4a and 5a formed on the upper surfaces of the weight portions 4 and 5.

Each of the weight portions 4 and 5 includes a recess section 41 or 51 opened in one surface (the lower surface) thereof and a solid section 40 or 50 one-piece formed with the recess section 41 or 51. The recess section 41 or 51 is formed to have a rectangular plan-view shape when seen in the direction normal to the open surface (in the up-down direction). Reinforcing walls 42 and 52 for bisecting the inside of the recess sections 41 and 51 are respectively one-piece formed with the weight portions 4 and 5.

One pair of the beam portions 6a and 6b interconnects the rim 3a and the substantially central sections in the x-direction of the side surfaces of the weight portion 4 facing the rim 3a. Similarly, another pair of the beam portions 7a and 7b interconnects the rim 3b and the substantially central sections in the x-direction of the side surfaces of the weight portion 5 facing the rim 3b. Accordingly, the straight line interconnecting the beam portions 6a and 6b and the straight line interconnecting the beam portions 7a and 7b respectively become rotation axes about which the weight portions 4 and 5 rotate.

The sensor chip 1 is formed by processing a SOI (Silicon-On-Insulator) substrate by a semiconductor fine processing technology. The sections including the upper surfaces of the weight portions 4 and 5 respectively become the movable electrodes 4a and 5a. Protrusions 43a and 43b, and 53a and 53b for preventing the weight portions 4 and 5 from directly colliding with the upper fixed plate 2a and the lower fixed plate 2b are respectively provided to protrude from the upper and lower surfaces of the weight portions 4 and 5.

The upper fixed plate 2a is made of an insulating material, e.g., glass, and is provided at the side of the movable electrodes 4a and 5a, i.e., above the sensor chip 1 in the illustrated example. On the lower surface of the upper fixed plate 2a, first and second fixed electrodes 20a and 20b are arranged side by side in the x-direction in such positions as to face the weight portion 4 (the movable electrode 4a) of the sensor chip 1 along the up-down direction. First and second fixed electrodes 21a and 21b are arranged side by side in the x-direction in such positions as to face the weight portion 5 (the movable electrode 5a) of the sensor chip 1 along the up-down direction. At one x-direction end side of the upper fixed plate 2a, five through-holes 22a through 22e are formed to extend through the upper fixed plate 2a in the y-direction to penetrate through the upper fixed plate 2a. On the lower surface of the upper fixed plate 2a, there is formed a plurality of conductive patterns (not shown) electrically connected to the respective fixed electrodes 20a, 20b, 21a and 21b.

On the other hand, four electrode units 8a, 8b, 9a and 9b spaced apart from the frame portion 3 are arranged side by side at one x-direction end side of the sensor chip 1. Detection electrodes 80a, 80b, 90a and 90b made of metal films are formed substantially at the centers of the upper surfaces of the four electrode portions 8a, 8b, 9a and 9b, respectively. Pressure contact electrodes 81a, 81b, 91a and 91b made of metal films are formed on the upper surfaces of the end sections of the four electrode units 8a, 8b, 9a and 9b facing the rims 3a and 3b. The detection electrode 80a (80b) and the pressure contact electrode 81a (81b) are connected to each other.

An earth electrode 10 is formed on the upper surface of the frame portion 3 between the electrode units 8b and 9a. The earth electrode 10 is electrically connected to the movable electrode 4a through the beam portions 6a and 6b and to the movable electrode 5a through the beam portions 7a and 7b. If the upper fixed plate 2a is bonded to the upper surface of the sensor chip 1, the conductive patterns formed on the lower surface of the upper fixed plate 2a are connected, by pressure contact, to the pressure contact electrodes 81a, 81b, 91a and 91b. Thus the respective detection electrodes 80a, 80b, 90a and 90b are electrically connected to the fixed electrodes 20a, 20b, 21a and 21b and are exposed to the outside through the through-holes 22a through 22d of the upper fixed plate 2a. The earth electrode 10 is also exposed to the outside through the through-hole 22e.

Similar to the upper fixed plate 2a, the lower fixed plate 2b is made of an insulating material such as glass or the like. The lower fixed plate 2b is provided at the opposite side of the sensor chip 1 from the upper fixed plate 2a, i.e., below the sensor chip 1. Adherence-preventing films 23a and 23b are respectively formed on the upper surface of the lower fixed plate 2b in positions corresponding to the weight portions 4 and 5 of the sensor chip 1 along the up-down direction. The adherence-preventing films 23a and 23b are made of the same material as the fixed electrodes 20a, 20b, 21a and 21b, e.g., aluminum-based alloy. The adherence-preventing films 23a and 23b serve to prevent the lower surfaces of the rotated weight portions 4 and 5 from adhering to the lower fixed plate 2b.

In the conventional example stated above, the rim 3a, the weight portion 4, the beam portions 6a and 6b, the movable electrode 4a, the first and second fixed electrodes 20a and 20b and the detection electrodes 80*a* and 80*b* make up one sensor unit. The rim 3*b*, the weight portion 5, the beam portions 7*a* and 7*b*, the movable electrode 5*a*, the first and second fixed electrodes 21*a* and 21*b* and the detection electrodes 90*a* and 90*b* make up another sensor unit. Two sensor units are one-piece formed with each other in a state that the orientations of the weight portions 4 and 5 (the arrangements of the solid sections 40 and 50 and the recess sections 41 and 51) are 180 degrees inverted on the same plane.

Description will now be made on the detection operation of the prior art example. First, it is assumed that acceleration is applied to the weight portion 4 in the x-direction. If acceleration is applied in the x-direction, the weight portion 4 rotates about the rotation axis thereof, thereby changing the distances between the movable electrode 4*a* and the first and second fixed electrodes 20*a* and 20*b*. As a result, capacitances C1 and C2 between the movable electrode 4*a* and the respective fixed electrodes 20*a* and 20*b* are also changed. In the regard, the capacitances C1 and C2 at the time of application of acceleration in the x-direction can be represented by the following equations:

$$C1 = C0 - \Delta C \qquad \text{Eq. 1}$$

and $$C2 = C0 + \Delta C \qquad \text{Eq. 2,}$$

where C0 denotes the capacitance between the movable electrode 4*a* and the respective fixed electrodes 20*a* and 20*b* when acceleration is not applied in the x-direction and $\Delta C$ denotes the capacitance change generated by the application of acceleration.

Similarly, the capacitances C3 and C4 between the movable electrode 5*a* and the respective fixed electrodes 21*a* and 21*b* at the time of application of acceleration to the weight portion 5 in the x-direction can be represented by the following equations:

$$C3 = C0 - \Delta C \qquad \text{Eq. 3}$$

and $$C4 = C0 + \Delta C \qquad \text{Eq. 4.}$$

In this connection, the values of the capacitances C1 through C4 can be detected by arithmetically processing the voltage signals extracted from the detection electrodes 80*a*, 80*b*, 90*a* and 90*b*. Then, the sum (±4$\Delta C$) of a differential value CA (=C1−C2) between the capacitances C1 and C2 acquired from one of the sensor units and a differential value CB (=C3−C4) between the capacitances C3 and C4 acquired from the other sensor unit is calculated. Based on the sum of the differential values CA and CB, it is possible to calculate the direction and magnitude of the acceleration applied in the x-direction.

Next, it is assumed that acceleration is applied to the weight portion 4 in the z-direction. If acceleration is applied in the z-direction, the weight portion 4 rotates about the rotation axis thereof, thereby changing the distances between the movable electrode 4*a* and the first and second fixed electrodes 20*a* and 20*b*. As a result, capacitances C1 and C2 between the movable electrode 4*a* and the respective fixed electrodes 20*a* and 20*b* are also changed. In the regard, the capacitances C1' and C2' at the time of application of acceleration in the z-direction can be represented by the following equations:

$$C1' = C0' - \Delta C' \qquad \text{Eq. 5}$$

and $$C2' = C0' + \Delta C' \qquad \text{Eq. 6,}$$

where C0' denotes the capacitance between the movable electrode 4*a* and the respective fixed electrodes 20*a* and 20*b* when acceleration is not applied in the z-direction and $\Delta C'$ denotes the capacitance change generated by the application of acceleration.

Similarly, the capacitances C3' and C4' between the movable electrode 5*a* and the respective fixed electrodes 21*a* and 21*b* at the time of application of acceleration to the weight portion 5 in the z-direction can be represented by the following equations:

$$C3 = C0 - \Delta C \qquad \text{Eq. 7}$$

and $$C4 = C0 + \Delta C \qquad \text{Eq. 8.}$$

Then, the difference (±4$\Delta C$) of a differential value CA' (=C1'−C2') between the capacitances C1' and C2' acquired from one of the sensor units and a differential value CB' (=C3'−C4') between the capacitances C3' and C4' acquired from the other sensor unit is calculated. Based on the difference of the differential values CA' and CB', it is possible to calculate the direction and magnitude of the acceleration applied in the z-direction. The arithmetic processing for finding the direction and magnitude of the acceleration applied in the x-direction and the z-direction using the sum of the differential values CA and CB and the difference of the differential values CA' and CB' is well-known in the art and, therefore, will not described in detail herein.

In the meantime, in the conventional acceleration sensor stated above, the respective electrode units 8*a*, 8*b*, 9*a* and 9*b* spaced apart from the weight portions 4 and 5 and the frame portion 3 and electrically insulated from the sensor chip 1 are connected to the fixed electrodes 20*a*, 20*b*, 21*a* and 21*b* by way of the pressure contact electrodes 81*a*, 81*b*, 91*a* and 91*b*. The capacitances C1 through C4 are detected through the detection electrodes 80*a*, 80*b*, 81*a* and 81*b* provided in the respective electrode units 8*a*, 8*b*, 9*a* and 9*b*. However, the spaces required to provide the respective electrode units 8*a*, 8*b*, 9*a* and 9*b* occupy about 30% to 40% of the area of the sensor chip 1. This poses a problem in that it becomes difficult to reduce the size of the acceleration sensor. Even if the size of the respective weight portions 4 and 5 is reduced, it is still necessary to provide the spaces for installation of the respective electrode units 8*a*, 8*b*, 9*a* and 9*b*. Thus difficulties are involved in reducing the size of the acceleration sensor.

SUMMARY OF THE INVENTION

In view of the above, the present invention provides an acceleration sensor in which no electrode units are required and the size thereof is reduced.

In accordance with an aspect of the present invention, there is provided an acceleration sensor. The acceleration sensor includes a sensor unit including a weight portion having a recess section with one open surface and a solid section one-piece formed with the recess section, a pair of beam portions configured to rotatably support the weight portion in such a state that the recess section and the solid section are arranged along a rotation direction, a movable electrode provided on the opposite surface of the weight portion from the open surface of the recess section to extend across the recess section and the solid section, a first fixed electrode arranged at the opposite side of the movable electrode from the recess section, a second fixed electrode arranged at the opposite side of the movable electrode from the solid section, detection electrodes electrically connected to the first fixed electrode and the second fixed electrode to detect a capacitance between the movable electrode and the first fixed electrode and the second fixed electrode, the acceleration sensor being configured to detect acceleration based on a change in the capacitance between the movable electrode and the first fixed electrode and the second fixed electrode generated when the weight portion rotates about a rotation axis defined by a line interconnecting the beam portions; a first fixed plate arranged in a spaced-apart relationship with a surface of the weight portion on which the movable electrode is provided; and embedment electrodes embedded in the first fixed plate to extend along a thickness direction of the first fixed plate, the embedment electrodes having one end portions facing the movable electrode to serve as the first fixed electrode and the second fixed electrode and the other end portions configured to serve as the detection electrodes.

The embedment electrodes may be formed of a P+ type semiconductor.

Acceleration applied to the weight portion in a first direction and acceleration applied to the weight portion in a second direction orthogonal to the first direction may be detected.

The sensor unit may include a plurality of sensor units formed in a single chip.

The sensor unit may include two sensor units formed in the single chip, one of the two sensor units rotated by 180 degrees on a single plane with respect to the other sensor unit.

The two sensor units may be arranged adjacent to each other.

The sensor unit includes three sensor units formed in the single chip, two of the three sensor chips respectively rotated by 90 degrees and 180 degrees on a single plane with respect to the remaining sensor unit.

Protrusions may be formed on the surfaces of the first fixed electrode and the second fixed electrode facing the movable electrode or on the surface of the movable electrode facing the first fixed electrode and the second fixed electrode.

The protrusions may be made of silicon or silicon oxide films.

The protrusions may have surface layers made of a carbon material.

The carbon material may be a carbon nano tube.

The sensor may further include a second fixed plate arranged in a spaced-apart relationship with the opposite surface of the weight portion from the first fixed electrode and the second fixed electrode, where the second fixed plate includes an adherence-preventing film for preventing the weight portion from adhering to the second fixed plate, the adherence-preventing film formed on the surface of the second fixed plate facing the weight portion.

The adherence-preventing film may be made of the same material as the first fixed electrode and the second fixed electrode.

The adherence-preventing film may be formed together with the first fixed electrode and the second fixed electrode.

The adherence-preventing film may be formed by a semiconductor manufacturing process.

The adherence-preventing film may be made of aluminum-based alloy.

The change in the capacitance between the movable electrode and the first fixed electrode and the second fixed electrode may be detected by generating an attraction force between the movable electrode and the first fixed electrode and the second fixed electrode.

A thin film made of an organic material may be formed on a surface of the adherence-preventing film.

The thin film may be a polyimide thin film.

The beam portions may be shifted toward the recess section such that an angle between a perpendicular line extending from a central position of the weight portion to the rotation axis and a surface of the movable electrode becomes substantially equal to 45 degrees.

In accordance with the aspect of the present invention, the embedment electrodes can serve as the fixed electrodes and the detection electrodes. This makes it possible to arrange the fixed electrodes and the detection electrodes along the thickness direction of the first fixed plate. Accordingly, electrode units for electrically connecting the fixed electrodes and the detection electrodes to the sensor become unnecessary, which makes it unnecessary to provide the spaces for installation of the electrode units. It is therefore possible to reduce the size of the sensor.

DETAILED DESCRIPTION OF THE EMBODIMENTS

Embodiments of an acceleration sensor in accordance with the present invention will now be described in detail with reference to the accompanying drawings. The basic configuration of the present invention is common to the prior art example set forth earlier. Common portions will be designated by like reference symbols with no description made thereon. In the following description, upper and lower sides in FIG. 1 will be defined as an up-down direction, the direction parallel to the width direction of a sensor chip 1 as an x-direction, the direction parallel to the longitudinal direction of the sensor chip 1 as a y-direction and the direction orthogonal to the x-direction and the y-direction as a z-direction.

First Embodiment

Figure 1:
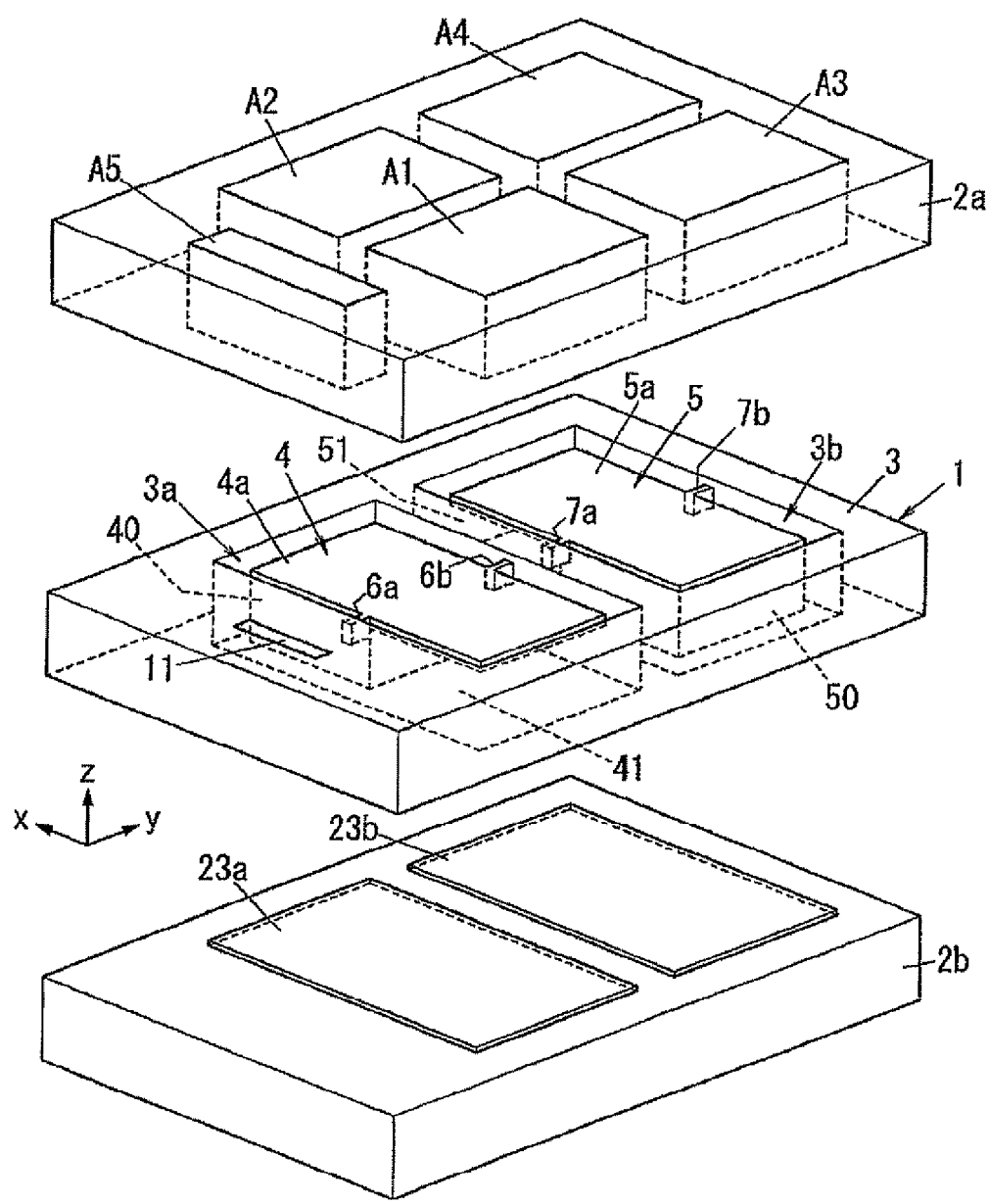
FIG. 1 is an exploded perspective view showing an acceleration sensor in accordance with a first embodiment of the present invention.
Figure 2:
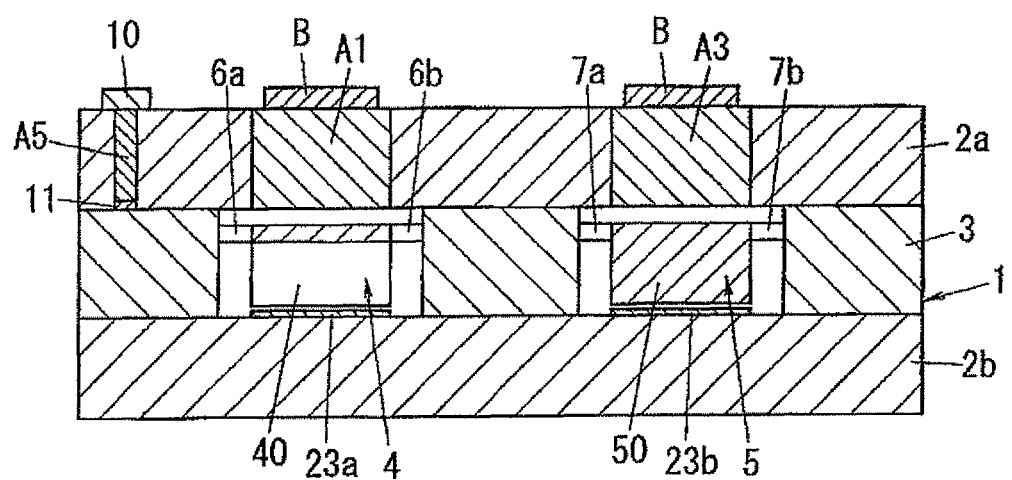
FIG. 2 is a cross sectional view of the acceleration sensor.

An acceleration sensor in accordance with a first embodiment is characterized in that, as shown in FIGS. 1 and 2, a plurality of (five in the illustrated example) silicon-made embedment electrodes A1 through A5 is embedded in the upper fixed plate 2a to extend along the thickness direction thereof. The embedment electrodes A1 through A4 are made of, e.g., low-resistance silicon (having a resistance of 0.2 $\Omega \cdot cm$ or less) doped with impurities at a high concentration. The lower end portions of the embedment electrodes A1 through A4 are exposed from the lower surface of the upper fixed plate 2a in such a fashion as to face the respective movable electrodes 4a and 5a. The upper end portions of the embedment electrodes A1 through A4 are exposed from the upper surface of the upper fixed plate 2a. Wiring electrodes B for wire bonding are attached to the exposed upper end portions of the embedment electrodes A1 through A4, the wiring electrodes B being made of a metallic material (e.g., aluminum).

Figure 4:
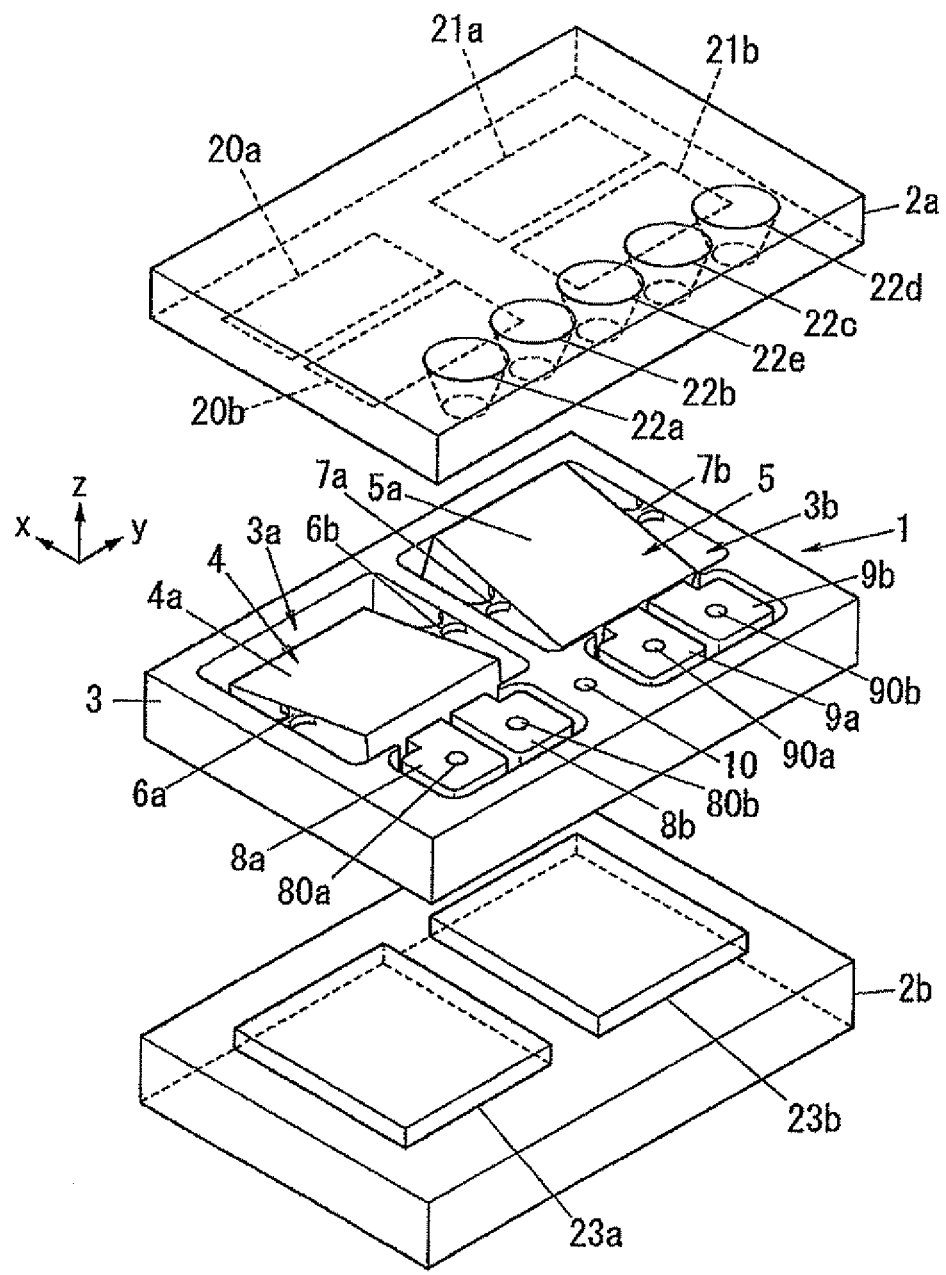
FIG. 4 is an exploded perspective view showing a conventional acceleration sensor.

Accordingly, the lower end portions of the embedment electrodes A1 through A4 are used as fixed electrodes (corresponding to the fixed electrodes 20a, 20b, 21a and 21b shown in FIG. 4), and the upper end portions of the embedment electrodes A1 through A4 are used as detection electrodes (corresponding to the detection electrodes 80a, 80b, 90a and 90b shown in FIG. 4). An earth electrode 10 is provided in the upper end portion of the embedment electrode A5. The lower end portion of embedment electrode A5 is brought into pressure contact with and electrically connected to a pressure contact electrode 11 embedded in the sensor chip 1, the pressure contact electrode 11 being made of a metallic material (e.g., aluminum). The movable electrode 4a (5a) is electrically connected to the earth electrode 10 via the pressure contact electrode 11 and the embedment electrode A5.

As set forth above, the embedment electrodes A1 through A4 can serve as the fixed electrodes and the detection electrodes. This makes it possible to arrange the fixed electrodes and the detection electrodes along the thickness direction of the upper fixed plate 2a. Therefore, the electrode units 8a, 8b, 9a and 9b of the conventional example (see FIG. 4) for electrically interconnecting the fixed electrodes and the detection electrodes need not be provided in the acceleration sensor of the present embodiment. This makes it unnecessary to provide the spaces for installation of the electrode units 8a, 8b, 9a and 9b, which assists in reducing the size of the acceleration sensor.

In addition, unlike the acceleration sensor of the prior art example, there is no need to interconnect the fixed electrodes 20a, 20b, 21a and 21b and the electrode units 8a, 8b, 9a and 9b through the use of the pressure contact electrodes 81a, 81b, 91a and 91b. In the manufacturing process of the acceleration sensor, it is therefore possible to partially simplify the step for anodic bonding of the sensor chip 1 and the upper fixed plate 2a.

In order to reduce noises, it is preferred that the wiring resistances of the embedment electrodes A1 through A4 serving as the fixed electrodes and the detection electrodes be as small as possible. In the present embodiment, the wiring resistances are reduced by forming the embedment electrodes A1 through A4 into a mass shape. It is also preferred that the embedment electrodes A1 through A4 be formed of a P+ type semiconductor. This makes it possible to secure an ohmic property with respect to the wiring electrodes B. Accordingly, a simplified process can be used in bonding the wiring electrodes B and the earth electrode 10 to the embedment electrodes A1 through A5. The material of the embedment electrodes A1 through A5 is not limited to the P+ type semiconductor but may be, e.g., an N+ type semiconductor. Moreover, the material of the embedment electrodes A1 through A5 is not limited to the semiconductor but may be a metallic material.

Second Embodiment

Figure 3A:
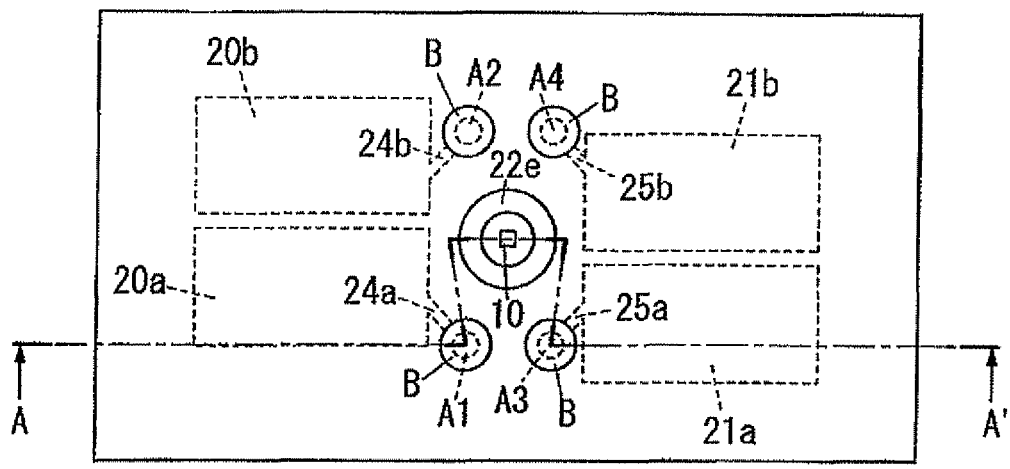
FIG. 3A is a plan view showing an acceleration sensor in accordance with a second embodiment of the present invention and FIG. 3B is a cross sectional view taken along line A-A' in FIG. 3A.
Figure 3B:
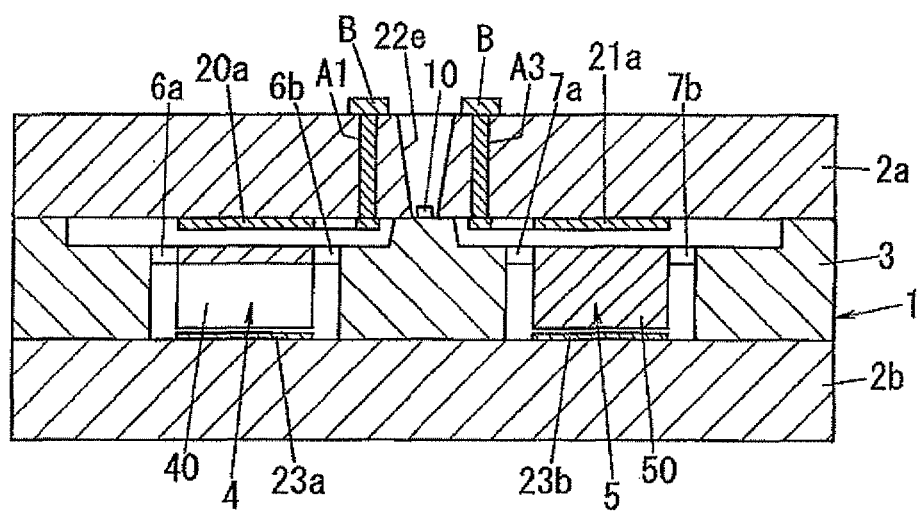

An acceleration sensor in accordance with a second embodiment of the present embodiment will now be described with reference to the drawings. The basic configuration of the present embodiment is common to the first embodiment. Common portions will be designated by like reference symbols with no description made thereon. The acceleration sensor of the present embodiment is characterized in that, as shown in FIGS. 3A and 3B, substantially rectangular extension portions 24a, 24b, 25a and 25b extending out of alignment with the weight portions 4 and 5 are one-piece formed with the respective fixed electrodes 20a, 20b, 21a and 21b and further that substantially cylindrical columnar embedment electrodes A1 through A4 are embedded in the upper fixed plate 2a, the embedment electrodes A1 through A4 having lower end portions bonded to the extension portions 24a, 24b, 25a and 25b and upper end portions to which wiring electrodes B are attached. A through-hole 22e is formed substantially at the center of the upper fixed plate 2a. An earth electrode 10 is provided in the portion of the sensor chip 1 exposed to the outside through the through-hole 22e.

As stated above, the embedment electrodes A1 through A4 are arranged out of alignment with the weight portions 4 and 5. This eliminates the possibility that a foreign material falls on the weight portions 4 and 5 through between the embedment electrodes A1 through A4 and the upper fixed plate 2a. Accordingly, it is possible to prevent the operations of the weight portions 4 and 5 from being hindered by a falling foreign material. In the present embodiment, the earth electrode 10 is exposed to the outside through the through-hole 22e. Therefore, unlike the first embodiment, there is no need to employ the embedment electrode A5 and the pressure contact electrode 11. This makes it possible to further simplify the step for anodic bonding of the sensor chip 1 and the upper fixed plate 2a.

In the respective embodiments described above, protrusions 43a, 43b, 53a and 53b are provided as is the case in the acceleration sensor of the prior art example. If the protrusions 43a, 43b, 53a and 53b are made of the same material, e.g., silicon or silicon oxide films, as the sensor chip, it becomes easy to manufacture the protrusions 43a, 43b, 53a and 53b. The surface layers of the protrusions 43a, 43b, 53a and 53b may be coated with a carbon material. In this case, the mechanical strength of the protrusions 43a, 43b, 53a and 53b grows higher. It is also possible to prevent the protrusions 43a, 43b, 53a and 53b from being damaged by the collision of the upper fixed plate 2a and the lower fixed plate 2b with the protrusions 43a, 43b, 53a and 53b.

Figure 5:
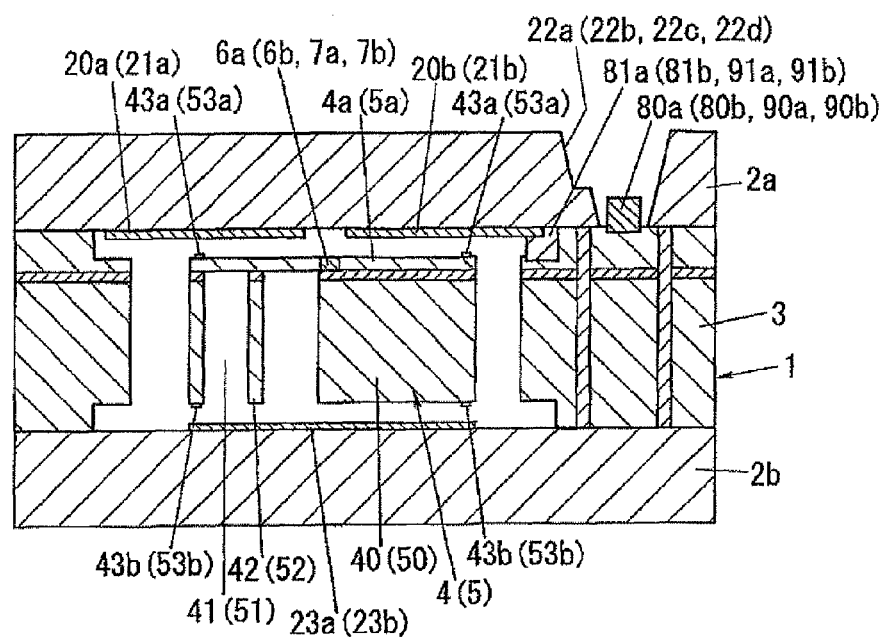
FIG. 5 is a section view of the conventional acceleration sensor.

If a carbon nano tube is used as the carbon material, it becomes possible to reduce the thickness of a coating and to easily adjust the height of the protrusions 43a, 43b, 53a and 53b to a desired value. The protrusions 43a and 43b, and 53a and 53b may be respectively provided on the surfaces of the movable electrodes 4a and 5a facing the fixed electrodes 20a and 20b, and 21a and 21b as is the case in the prior art example shown in FIG. 5, or the protrusions 43a, 43b, 53a and 53b may be provided on the surfaces of the respective fixed electrodes 20a, 20b, 21a and 21b facing the movable electrodes 4a or 5a.

In the respective embodiments described above, adherence-preventing films 23a and 23b are provided as is the case in the acceleration sensor of the prior art example. If the adherence-preventing films 23a and 23b are made of the same material as the fixed electrodes 20a, 20b, 21a and 21b, it becomes possible to easily form the adherence-preventing films 23a and 23b. At this time, if the adherence-preventing films 23a and 23b are formed together with the fixed electrodes 20a, 20b, 21a and 21b, it is possible to increase the accuracy of the distance between the weight portions 4 and 5 and the fixed electrodes 20a, 20b, 21a and 21b and the distance between the weight portions 4 and 5 and the lower fixed plate 2b.

If the adherence-preventing films 23a and 23b are formed through a semiconductor manufacturing process, fine asperities are left on the surfaces of the adherence-preventing films 23a and 23b. This makes it possible to more reliably prevent the weight portions 4 and 5 from adhering to the lower fixed plate 2b. In this regard, if the adherence-preventing films 23a and 23b are made of aluminum-based alloy, it becomes easy to perform etching. Short-circuit between the adherence-preventing films 23a and 23b and the weight portions 4 and 5 may be prevented by forming an organic thin film, e.g., a polyimide thin film, on the surfaces of the adherence-preventing films 23a and 23b, to be highly compatible with a semiconductor manufacturing process and easy to process.

In the respective embodiments described above, the beam portions 6a and 6b, and 7a and 7b are respectively shifted toward the recess sections 41 and 51 from the longitudinal centers of the weight portions 4 and 5. Thus the angle θ between the perpendicular line extending from the central position of each of the weight portions 4 and 5 to the rotation axis and the surface of each of the movable electrodes 4a and 5a becomes substantially equal to 45 degrees. Accordingly, the angle θ can be kept substantially at 45 degrees by merely shifting the beam portions 6a, 6b, 7a and 7b. This makes it possible to enhance the detection sensitivity without having to increase the thickness of the weight portions 4 and 5 or to make the weight portions 4 and 5 light.

In the respective embodiments described above, the operation of the acceleration sensor can be confirmed in the below-mentioned order. Specifically, the weight portion 4 or 5 is rotated by generating an attraction force between the embedment electrode A1 or A2 (the first fixed electrode 20a or the second fixed electrode 20b) and the movable electrode 4a or between the embedment electrode A3 or A4 (the first fixed electrode 21a or the second fixed electrode 21b) and the movable electrode 5a. The normal operation of the acceleration sensor can be confirmed by detecting the change in the capacitance between the embedment electrodes A1 through A4 (the fixed electrodes 20a, 20b, 21a and 21b) and the weight portion 4 or 5 generated by the rotation of the weight portion 4 or 5. Alternatively, the operation of the acceleration sensor may be confirmed by generating an attraction force between the adherence-preventing films 23a and 23b and the movable electrodes 4a and 5a.

In the respective embodiments described above, the acceleration sensor for detecting accelerations in two directions, i.e., in the x-direction and the z-direction, has been described by way of example. However, if one of the sensor units is rotated 90 degrees within the x-y plane and arranged in a symmetrical relationship with respect to the other sensor unit, it is possible to realize an acceleration sensor capable of detecting accelerations in three directions including the y-direction. As an alternative example, if three sensor units are arranged in a same single chip and if two of the sensor units are rotated by 90 degrees and 180 degrees within the x-y plane and arranged in a symmetrical relationship with respect to the remaining sensor unit, it is possible to realize an acceleration sensor capable of detecting accelerations in three directions.

While the invention has been shown and described with respect to the embodiments, it will be understood by those skilled in the art that various changes and modifications may be made without departing from the scope of the invention as defined in the following claims.

What is claimed is:

1. An acceleration sensor, comprising:
a sensor unit including a weight portion, a pair of beam portions configured to rotatably support the weight portion, a movable electrode provided on a surface of the weight portion, and a fixed electrode;
a fixed plate arranged in a spaced-apart relationship with the surface of the weight portion on which the movable electrode is provided, the fixed electrode being arranged on one of two opposite surfaces of the fixed plate which faces the movable electrode; and
an embedment electrode having end portions, the embedment electrode embedded in the fixed plate in a way such that the embedment electrode extends through the fixed plate along a thickness direction of the fixed plate so that one of the end portions is arranged on said one of the surfaces of the fixed plate and the other of the end portions is configured to serve as a detection electrode on the other of the surfaces of the fixed plate,
wherein the fixed electrode is connected to said one of the end portions of the embedment electrode by an extension portion provided therebetween such that the embedment electrode is arranged out of alignment with the weight portion.

2. The sensor of claim 1, wherein the embedment electrode is formed of a P+ type semiconductor.

3. The sensor of claim 1, wherein acceleration applied to the weight portion in a first direction and acceleration applied to the weight portion in a second direction orthogonal to the first direction are detected.

4. The sensor of claim 3, wherein the sensor unit includes a plurality of sensor units formed in a single chip.

5. The sensor of claim 4, wherein the sensor unit includes two sensor units formed in the single chip, one of the two sensor units rotated by 180 degrees on a single plane with respect to the other sensor unit.

6. The sensor of claim 5, wherein the two sensor units are arranged adjacent to each other.

7. The sensor of claim 4, wherein the sensor unit includes three sensor units formed in the single chip, two of the three sensor chips respectively rotated by 90 degrees and 180 degrees on a single plane with respect to the remaining sensor unit.

8. The sensor of claim 1, wherein protrusions are formed on a surface of the fixed electrode facing the movable electrode or on a surface of the movable electrode facing the fixed electrode.

9. The sensor of claim 8, wherein the protrusions are made of silicon or silicon oxide films.

10. The sensor of claim 8, wherein the protrusions have surface layers made of a carbon material.

11. The sensor of claim 10, wherein the carbon material is a carbon nano tube.

12. The sensor of claim 1, further comprising:
an additional fixed plate arranged in a spaced-apart relationship with another surface of the weight portion which is opposite to the surface of the weight portion on which the movable electrode is provided,
wherein the additional fixed plate includes an adherence-preventing film for preventing the weight portion from adhering to the additional fixed plate, the adherence-preventing film being formed on a surface of the additional fixed plate facing the weight portion.

13. The sensor of claim 12, wherein the adherence-preventing film is made of the same material as the fixed electrode.

14. The sensor of claim 12, wherein the adherence-preventing film is formed together with the fixed electrode.

15. The sensor of claim 12, wherein the adherence-preventing film is formed by a semiconductor manufacturing process.

16. The sensor of claim 12, wherein the adherence-preventing film is made of aluminum-based alloy.

17. The sensor of claim 12, wherein a change in a capacitance between the movable electrode and the fixed electrode is detected by generating an attraction force between the movable electrode and the fixed electrode.

18. The sensor of claim 17, wherein a thin film made of an organic material is formed on a surface of the adherence-preventing film.

19. The sensor of claim 18, wherein the thin film is a polyimide thin film.

20. The sensor of claim 1, wherein the weight portion has a recess section and a solid section,
   wherein the weight portion is configured to rotate about a rotation axis defined by a line interconnecting the beam portions, and
   wherein the beam portions are shifted toward the recess section such that an angle between a perpendicular line extending from a central position of the weight portion to the rotation axis and a surface of the movable electrode becomes substantially equal to 45 degrees.

21. The sensor of claim 1, wherein the fixed plate has a through-hole and the sensor unit has an additional electrode, and
   wherein the additional electrode is exposed to an outside through the through-hole.

22. The sensor of claim 21, wherein the additional electrode is an earth electrode.

* * * * *